US012358212B2

(12) United States Patent
Joshipura et al.

(10) Patent No.: US 12,358,212 B2
(45) Date of Patent: Jul. 15, 2025

(54) SYSTEM AND METHOD FOR ULTRASOUND-INDUCED ADDITIVE MANUFACTURING OF POLYMERS AND COMPOSITES

(71) Applicant: Lawrence Livermore National Security, LLC, Livermore, CA (US)

(72) Inventors: Ishan Joshipura, Oakland, CA (US); Martin De Beer, Berkeley, CA (US); Jordan Seiji Lum, Livermore, CA (US); Maxim Shusteff, Piedmont, CA (US); David Matthew Stobbe, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/668,205

(22) Filed: Feb. 9, 2022

(65) Prior Publication Data
US 2023/0249397 A1    Aug. 10, 2023

(51) Int. Cl.
*B29C 64/129* (2017.01)
*B29C 64/268* (2017.01)
*B29C 64/277* (2017.01)
*B29C 64/393* (2017.01)
*B33Y 10/00* (2015.01)
*B33Y 30/00* (2015.01)
(Continued)

(52) U.S. Cl.
CPC .......... *B29C 64/129* (2017.08); *B29C 64/268* (2017.08); *B29C 64/277* (2017.08); *B29C 64/393* (2017.08); *B33Y 10/00* (2014.12); *B33Y 30/00* (2014.12); *B33Y 50/02* (2014.12); *B33Y 70/10* (2020.01)

(58) Field of Classification Search
CPC ... B29C 64/129; B29C 64/393; B29C 64/277; B29C 64/268; B29C 64/124; B29C 64/205; B29C 65/08; B29C 65/1438
See application file for complete search history.

(56) References Cited

U.S. PATENT DOCUMENTS

2006/0271875 A1   11/2006   Green et al.
2013/0289593 A1*  10/2013   Hall .................... G10K 11/004
                                                       264/109
(Continued)

OTHER PUBLICATIONS

Tektronix Signal Generator Fundamentals (Year: 2009).*
(Continued)

*Primary Examiner* — Alison L Hindenlang
*Assistant Examiner* — Erica Hartsell Funk
(74) *Attorney, Agent, or Firm* — HARNESS DICKEY & PIERCE PLC

(57) ABSTRACT

The present disclosure relates to an additive manufacturing system for forming at least one of forming a part or modifying a surface using a volume of polymerizable resin. The system makes use of a subsystem for generating power output signals, and at least one acoustic transducer. The acoustic transducer is placed in a vicinity of the volume of polymerizable resin and is responsive to the power output signals. The acoustic transducer generates and projects ultrasound energy in response to receiving the power output signals to at least one spatial location within the volume of resin to cause polymerization of at least a portion of the volume of resin to at least one of form the part or modify the surface.

18 Claims, 4 Drawing Sheets

(51) Int. Cl.
*B33Y 50/02* (2015.01)
*B33Y 70/10* (2020.01)

(56) References Cited

U.S. PATENT DOCUMENTS

| | | | |
|---|---|---|---|
| 2016/0271875 A1* | 9/2016 | Brown, Jr. | B29C 64/135 |
| 2018/0250890 A1 | 9/2018 | Claussen et al. | |
| 2018/0304500 A1 | 10/2018 | Putkis | |
| 2020/0001533 A1* | 1/2020 | Packirisamy | B28B 1/001 |
| 2020/0298488 A1 | 9/2020 | Eisaman et al. | |
| 2021/0114292 A1 | 4/2021 | Acharya et al. | |
| 2021/0252343 A1* | 8/2021 | Kim | A63B 37/0063 |
| 2022/0037048 A1* | 2/2022 | Steadman Booker | G21K 1/025 |

OTHER PUBLICATIONS

Cai, Journal of Loss Prevention in the Process Industries, Comprehensive alarm information processing technology with application in petrochemical plant, (Year: 2015).*

Chatel, G.; Novikova, L.; Petit, S. How Efficiently Combine Sonochemistry and Clay Science? *Appl. Clay Sci.* 2016, 119, 193-201. https://doi.org/10.1016/j.clay.2015.10.019.

Hill, M.; Harris, N. R. Ultrasonic Particle Manipulation. In *Microfluidic Technologies for Miniaturized Analysis Systems*; Hardt, S., Schönfeld, F., Eds.; Springer US: Boston, MA, 2007; pp. 357-392. https://doi.org/10.1007/978-0-387-68424-6_9.

Ma, J.; Lin, Y.; Kim, Y.- W.; Ko, Y.; Kim, J.; Oh, K. H.; Sun, J.-Y.; Gorman, C. B.; Voinov, M. A.; Smirnov, A. I.; Genzer, J.; Dickey, M. D. Liquid Metal Nanoparticles as Initiators for Radical Polymerization of Vinyl Monomers. *ACS Macro Lett.* 2019, 8 (11), 1522-1527. https://doi.org/10.1021/acsmacrolett.9b00783.

Chigarev, N.; Sathyan, S.; Raetz, S.; Tournat, V.; Bulou, A.; Zerr, A.; Goussev, V. Studying the Polymerization of 2-(Hydroxyethyl) Methacrylate Using Laser Ultrasonics Techniques. In *e-Forum Acusticum (FA2020)*; Lyon, France, 2020.

Wang, Zhao, Ayarza, Jorge, Esser-Kahn, Aaron P. Mechanically Initiated Bulk-Scale Free-Radical Polymerization. Angewandte Chemie International Ed. 58, No. 35 (2019): 12023-26. https://doi.org/10.1002/anie.201903956.

Kelly, Brett E., Bhattacharya, Indrasen, Heidari, Hossein, Shusteff, Maxim, Spadaccini, Christopher M., and Taylor, Hayden K. Volumetric Additive Manufacturing via Tomographic Reconstruction. Science (New York, N.Y.) 363, No. 6431 (Mar. 8, 2019): 1075-79. https://doi.org/10.1126/science.aau7114.

McKenzie, Thomas G., Karimi, Fatemeh, Ashokkumar, Muthupandian, and Qiao, Greg G. Ultrasound and Sonochemistry for Radical Polymerization: Sound Synthesis. Chemistry—A European Journal 25, No. 21 (2019): 5372-88. https://doi.org/10.1002/chem.201803771.

International Search Report and Written Opinion of the International application No. PCT/US2023/012593 mailed May 24, 2023.

* cited by examiner

SYSTEM AND METHOD FOR ULTRASOUND-INDUCED ADDITIVE MANUFACTURING OF POLYMERS AND COMPOSITES

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and methods for manufacturing components and products from polymers, and more particularly to systems and methods which employ acoustic energy to initiate controlled polymerization of a quantity of polymer to construct two and three dimensional parts.

BACKGROUND

The statements in this section merely provide background information related to the present disclosure and may not constitute prior art.

Current photo-polymerization-based advanced manufacturing (AM) processes require extensive efforts to formulate resins that are suitable for the light-source. In addition, any additives (surfactants, fillers, etc.) must match the refractive index of the resin. In addition, polymerization may require a balance between photo-initiators and free-radical scavengers to optimize the reaction kinetics. In some cases, the use of UV-based polymerization may not be compatible or require complex formulations (bio-compatible photo-initiators, surfactants, etc.). In summary then, while photo polymerization-based systems and methods have proven highly useful in manufacturing 3D parts and components, a number of limitations still exist when relying on an optical signal to initiate the polymerization process.

SUMMARY

This section provides a general summary of the disclosure, and is not a comprehensive disclosure of its full scope or all of its features.

In one aspect the present disclosure relates to an additive manufacturing system for forming at least one of forming a part or modifying a surface using a volume of polymerizable resin. The system makes use of a subsystem for generating power output signals, and at least one acoustic transducer. The acoustic transducer is placed in a vicinity of the volume of polymerizable resin and is responsive to the power output signals. The acoustic transducer generates and projects ultrasound energy in response to receiving the power output signals to at least one spatial location within the volume of resin to cause polymerization of at least a portion of the volume of resin to at least one of form the part or modify the surface.

In another aspect the present disclosure relates to an additive manufacturing system for at least one of forming a part or modifying a surface using a volume of polymerizable resin. The system may comprise a subsystem for generating power output signals, and an electronic control system having a memory, with the memory including a software module which makes use of data. The data may be associated with at least one of an algorithm to help create the power output signals, or a design file to help create the power output signals, or a look-up table to help create the power output signals, or a pressure map, to help create the power output signals. A plurality of acoustic transducers is included, with the acoustic transducers placed in a vicinity of the volume of polymerizable resin to at least partially circumscribe the volume of polymerizable resin. The acoustic transducers are responsive to the power output signals. The plurality of acoustic transducers is further configured to generate and project ultrasound energy in response to receiving the power output signals to a plurality of spatial locations within the volume of polymerizable resin to cause polymerization of portions of the volume of polymerizable resin, in accordance with the data, to at least one of form the part or modify the surface.

In still another aspect the present disclosure relates to a method for at least one of manufacturing a part or modifying a surface using a volume of polymerizable resin. The method may comprise providing data selected to help at least one of construct the part or modify the surface, and using the data to help create and propagate ultrasound energy into the volume of polymerizable resin. The method may further include using the ultrasound energy to polymerize at least one select spatial region within the volume of resin to at least one of create the part, or to modify the surface, in accordance with the data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

DETAILED DESCRIPTION

Example embodiments will now be described more fully with reference to the accompanying drawings.

The present disclosure overcomes the above described challenges by utilizing ultrasound (instead of light or heat) to initiate and control polymerization. Thus, the primary advantages of the approach taken by the present disclosure include faster polymerization and simpler resin formulations (no photo or thermal initiators).

The present disclosure involves embodiments and methods which utilize cavitation bubbles generated within liquid resin by ultrasonic energy that trigger, induce, or catalyze a polymerization process. Modulating the ultrasound wave (frequency and/or amplitude) spatially changes the site of cavitation within a volume of resin. Thus, the embodiments and methods of the present disclosure enable selectively polymerizing different regions within a resin to form components with either 1-D, 2-D, or 3-D shapes controlled by spatially focusing the ultrasonic energy within a resin bath. In some embodiments disclosed herein the acoustic energy is ultrasound energy. The ultrasound energy may be generated by, for example and without limitation, piezoelectric transducers or high-power lasers. In various embodiments the liquid resin may contain monomer(s), and/or solvent, and/or additives such as filler materials, and/or surfactants, and/or catalysts, or mixtures thereof. Ultrasound energy may be generated by piezoelectric transducers, high-power lasers or other suitable devices. Ultrasound energy may be directed by utilizing one or more acoustic transducers, and/or by controlling a geometry of the resin bath, and/or by shaped transducers (i.e., high-intensity focused ultrasound or HIFU transducers). In addition, in some embodiments diffuse ultrasonic energy (sonication baths or flow-through sonication cells) may form micro-encapsulation and micro or nano-particles, or embed the aforementioned particles into another material to form composite materials (e.g., a polymer with metal filler(s)). The use of either standing-wave or laser-induced ultrasound can allow thin films or membranes to be formed. The laser-based approach may create or encode topographical features onto thin-films or coatings.

Figure 1:
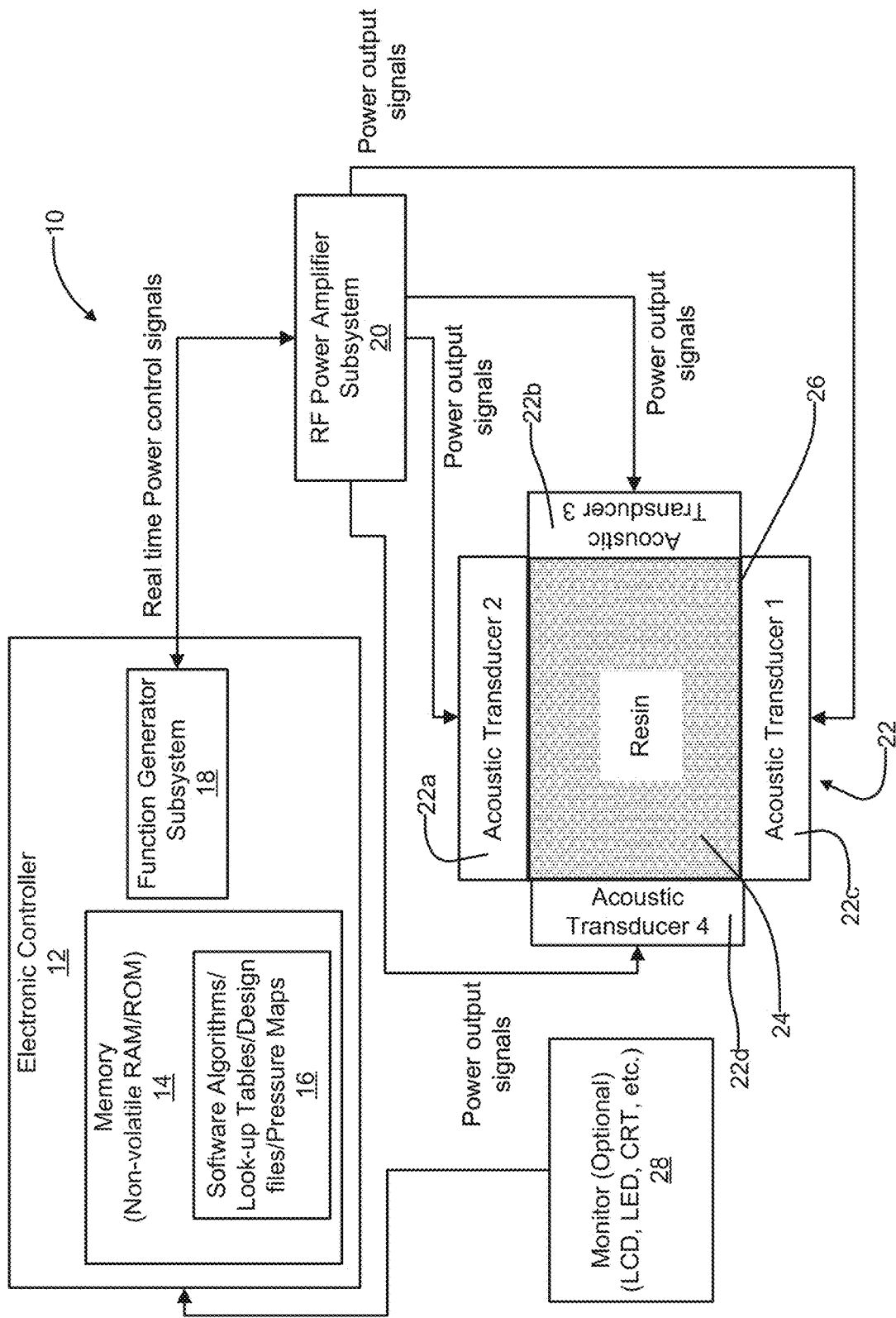
FIG. 1 is a high level block diagram of one embodiment of a system in accordance with the present disclosure which makes use of four independently controlled acoustic transducers to controllably initiate polymerization of a resin contained within a centrally located resin container.

Referring to FIG. 1, one embodiment of a system 10 in accordance with the present invention is shown which makes use of acoustic energy to selectively initiate polymerization of a photo-polymerizable resin. The system 10 in this example makes use of an electronic controller 12 (e.g., microprocessor or microcontroller based) having a memory (e.g., non-volatile RAM, ROM, etc.) 14 for storing a software module 16. The software module 16 may include, without limitation, one or more of specific algorithms, one or more look-up tables, one or more design files, one or more pressure maps, or a combination of the foregoing, which is/are used by the electronic controller 12 in determining the needed electrical control signals for use by other components in generating the needed acoustic energy signals for carrying out a polymerization operation on a quantity of resin to make a specific component.

The electronic controller 12 also includes a function generator subsystem 18 for using control signals provided by the electronic controller in generating real time power and control signals which are provided to an RF power amplifier subsystem 20. The RF power amplifier subsystem generates power output signals (e.g., DC signals) which are selectively applied to one or more acoustic transducers 22. FIG. 1 shows four acoustic transducers 22a, 22b, 22c and 22d being used, and arranged in a rectangular spatial pattern, to radiate acoustic energy into a quantity of resin 24 contained within a resin container 26. Optionally the spatial pattern of acoustic transducers 22a-22d may be square or circular, or oblong, etc. However, it will be appreciated that the system 10 is not limited to use with any specific number of acoustic transducers 22 or any specific spatial arrangement of acoustic transducers, and some applications may require just one, while others may optimally require more than four in predetermined spatial arrangement around the resin container 26. Factors determining the optimum number of acoustic transducers 22 may be, without limitation, the shape of the component being formed with the resin 24, the complexity of the part being formed, the specific resin 24 formulation being used, as well as the specific type/construction of the acoustic transducer(s) 22 being used, or a combination of the foregoing factors. Optionally, a monitor 28 such as an LED, LCD, CRT, laptop, table, or possibly even a smartphone, may be used to monitor various performance variables during the polymerization process carried out by the system 10. Still another way of monitoring the reaction is to use one of the acoustic transducers 22 while operating it at a significantly higher frequency and at a low power, similar to how an ultrasound is performed in a medical setting. This was observed by the co-inventors during work with the system 10. The emitted sound from the transducer 22 decreased as polymerization proceeded. The sound emitted from the transducer 22 became imperceptible to the human ear when polymerization was fully complete. The specific interface used (e.g., HDMI, RS-232, USB, etc.) to interface the monitor 28 to the electronic controller 12 will be dictated at least in part by the specific type of monitor or monitoring device being used.

The system 10 uses the acoustic transducers 22a-22d to generate acoustic energy, and in preferred form ultrasound energy, which is focused by controlling one or more of a frequency, and/or duration and/or amplitude, of the ultrasound energy to trigger, induce or catalyze a polymerization process within the resin 24. Controllably modulating the ultrasound waves emitted by the acoustic transducers 22a-22d, for example by controlling one or more of frequency, amplitude and/or pulse duration, spatially changes the specific locations within the volume of resin 24 where cavitation occurs, and thus where polymerization occurs. The locations where cavitation occurs can also be controlled if one is using reflective plates (e.g., glass plates, discussed in connection with the embodiment of FIG. 3) that reflect the ultrasound. For example, if the system 10 is configured in a square or rectangular configuration with a transducer 22 facing a spaced apart reflective plate, then moving either the reflective plate or the transducer a few millimeters further into the resin 24 will affect operation of the system 10, and more specifically, where cavitation will occur spatially within the resin.

With regard to the mention of "cavitation" discussed above, it will be appreciated that this term is used to describe the collapse, or the implosion of, bubbles which are initially formed in specific regions of the resin where polymerization is to be initiated through exposure to the acoustic energy. As the bubbles formed within a given volume of resin 24 are exposed to continued acoustic energy they eventually implode, which triggers or induces or catalyzes a polymerization process in the resin 24. Thus, controlling the frequency, amplitude, duration and other factors of the acoustic energy from the acoustic transducers 22, such as mentioned above, can change the spatial location(s) within of the volume of resin 24 where pressure is built up, and thus control where cavitation of the bubbles formed in the resin 24, thus controlling the spatial regions where polymerization is initiated within the volume of resin.

The acoustic transducers 22a-22d may be formed from a variety of different components, for example and without limitation, piezoelectric transducers or high power lasers. A combination of such components may also be used. The acoustic transducers 22a-22d may be energized simultaneously all at once to propagate desired amounts of ultrasound energy into different spatial regions of the volume of resin 24, or they may be energized sequentially in a specific order or pattern, or possibly using a combination of simultaneous and sequential energization patterns. Furthermore, while the acoustic transducers 22a-22d are all illustrated as being located in the same horizontal plane, it is anticipated that some applications may benefit by having the acoustic transducers arranged at different elevational positions around the volume of resin 24 (e.g., in a spherical arrangement around the resin 24), and the specific locations of the acoustic transducers may be dictated in part on a number of variables including the specific shape and/or size of the part being formed, the specific formulation of the resin 24, and potentially other factors as well.

Figure 2:
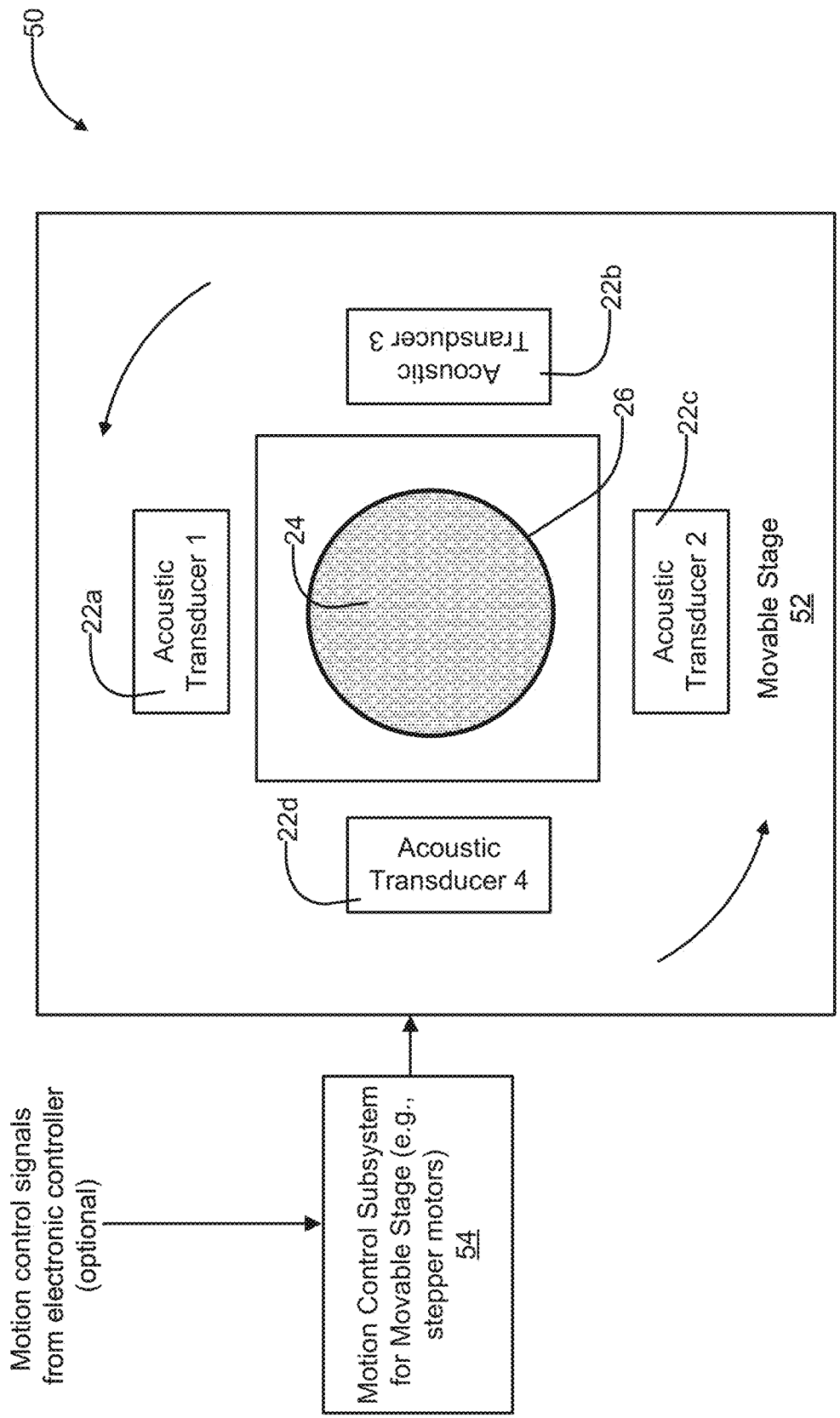
FIG. 2 is a simplified plan view of an alternative embodiment of the system of FIG. 1 which employs a rotationally movable stage to rotate a plurality of four acoustic transducers around a stationary resin container holding a quantity of resin.

FIG. 2 shows a system 50 in accordance with another embodiment of the present disclosure in which the acoustic transducers 22a-22d are all mounted on a movable stage 30. Rotational movement of the movable stage 52 may be controlled by a motion control subsystem 54 which includes, for example and without limitation, one or more stepper motors for controlling rotation of the movable stage 30 in a highly controlled manner. In this embodiment the acoustic transducers 22a-22d may be all of the same type and construction, or they may differ in type or construction, and each may be used to project ultrasound energy into one or more specific regions within the volume of resin 24 as the movable stage 52 is rotated. Like the system 10 shown in FIG. 1, the acoustic transducers 22a-22d are all shown located in a common horizontal plane, generally equidistant from the resin container 26, although they could just as readily be configured in a spherical configuration (i.e., in different elevational planes), or in any other configuration, and/or at different distances from the volume of resin 24. With the movable stage 52, the option of using just a single acoustic transducer 22, and rotationally positioning the acoustic transducer as needed at different angular positions during the part forming process, while modifying the ultrasound energy as needed at each angular position, becomes a workable option.

Figure 3:
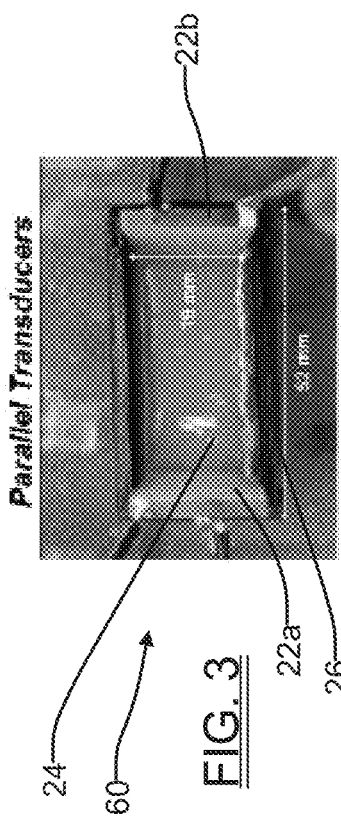
FIG. 3 is an overhead image of another embodiment of the present disclosure where two acoustic transducers are used and spaced laterally from one another, on opposing sides of a resin container, to generate the acoustic energy which is propagated into the volume of resin.

FIG. 3 shows an image of a system 60 in accordance with another embodiment of the present disclosure which makes use of two parallel facing, spaced apart ones of the acoustic transducers 22a and 22b. The resin container 26 holds a quantity of the resin 24 between the two acoustic transducers 22a and 22b, and the resin is exposed to ultrasound energy from opposing directions.

Laboratory experiments of the co-inventors using COMSOL simulations showed the laminar arrangement of standing waves, as predicted and observed from latex particle arrangements within a liquid bath of water. In general, however, it will be understood that cavitation that leads to polymerization is most likely to occur at frequencies from about 300 kHz to about 750 kHz.

Figure 4:
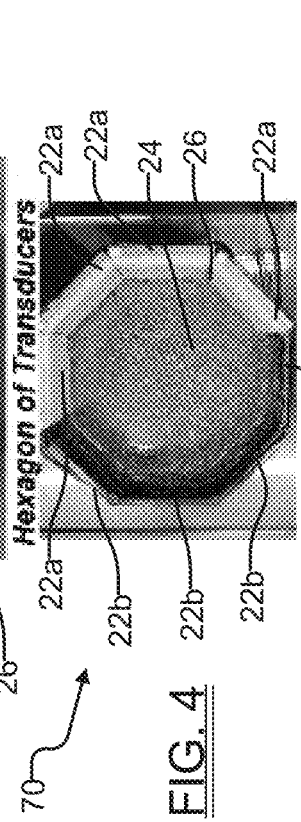
FIG. 4 is an embodiment of the present disclosure showing an overhead image of a plurality of acoustic transducers arranged in a hexagonal configuration around a volume of resin, with four transducers on the right side of the structure and four reflectors on the left side.

FIG. 4 shows an image of a system 70 in accordance with another embodiment of the present disclosure which configures four transducers 22a and four reflector panels 22b in an octagonal configuration around the resin container 26. Further COMSOL simulations initially confirmed that pressure is concentrated at the center with symmetrical nodes and anti-nodes that dissipate radially away from the center. Further experiments indicated that destructive interference prevented cavitation from occurring, despite particle alignment, at anti-nodes. Further COMSOL simulation showed that this particular configuration of acoustic transducers is highly sensitive to bath dimensions and the arrangement of transducers.

Optionally, five acoustic transducers 22 could be configured in a pentagonal configuration, or six acoustic transducers could be configured in a hexagonal configuration. Other multi-sided configurations (e.g., triangular) are also possible.

Figure 5:
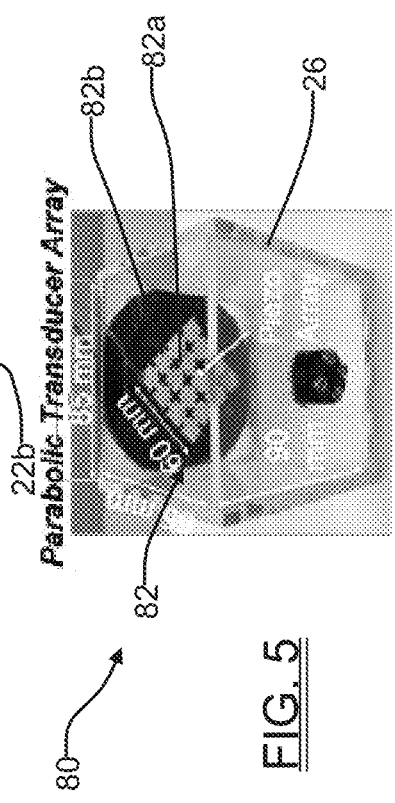
FIG. 5 is a perspective view of another embodiment of a parabolic transducer.

FIG. 5 shows yet another system 80 in accordance with another embodiment of the present disclosure in which a parabolic transducer array 82 is used to provide the ultrasound energy into the resin 24. In this example the parabolic transducer array 82 forms a single subsystem with a plurality of independently controllable piezoelectric transducers 82a formed on a substrate 82b. The parabolic transducer 82 in this example is positioned along one side of the resin container 26, although it may be positioned essentially anywhere around the resin container.

The systems 60, 70 and 80, while not illustrated in FIGS. 3, 4 and 5 with all of the components shown in FIG. 1, will be understood to make use of some or all of the components shown in FIG. 1 as well.

Specific efforts were also made by the co-inventors to confirm the user of lasers to induce cavitation, and thus cause a controlled polymerization of the volume of resin 24. Specific work involved the use of a 1024 nm laser pulse from a Nd:YAG laser within aqueous solutions containing monomers and metal catalysts. The laser produced a plasma at a focal point within the liquid. The plasma then generated cavitation bubbles that imploded to generate radicals. The laser cavitation approach was thus successful in polymerizing monomer solutions of PEGDA in water with both eutectic gallium indium (EGaIn), which is a liquid metal alloy, and with aluminum nanoparticles within 5 to 10 minutes of laser irradiation.

Figure 6:
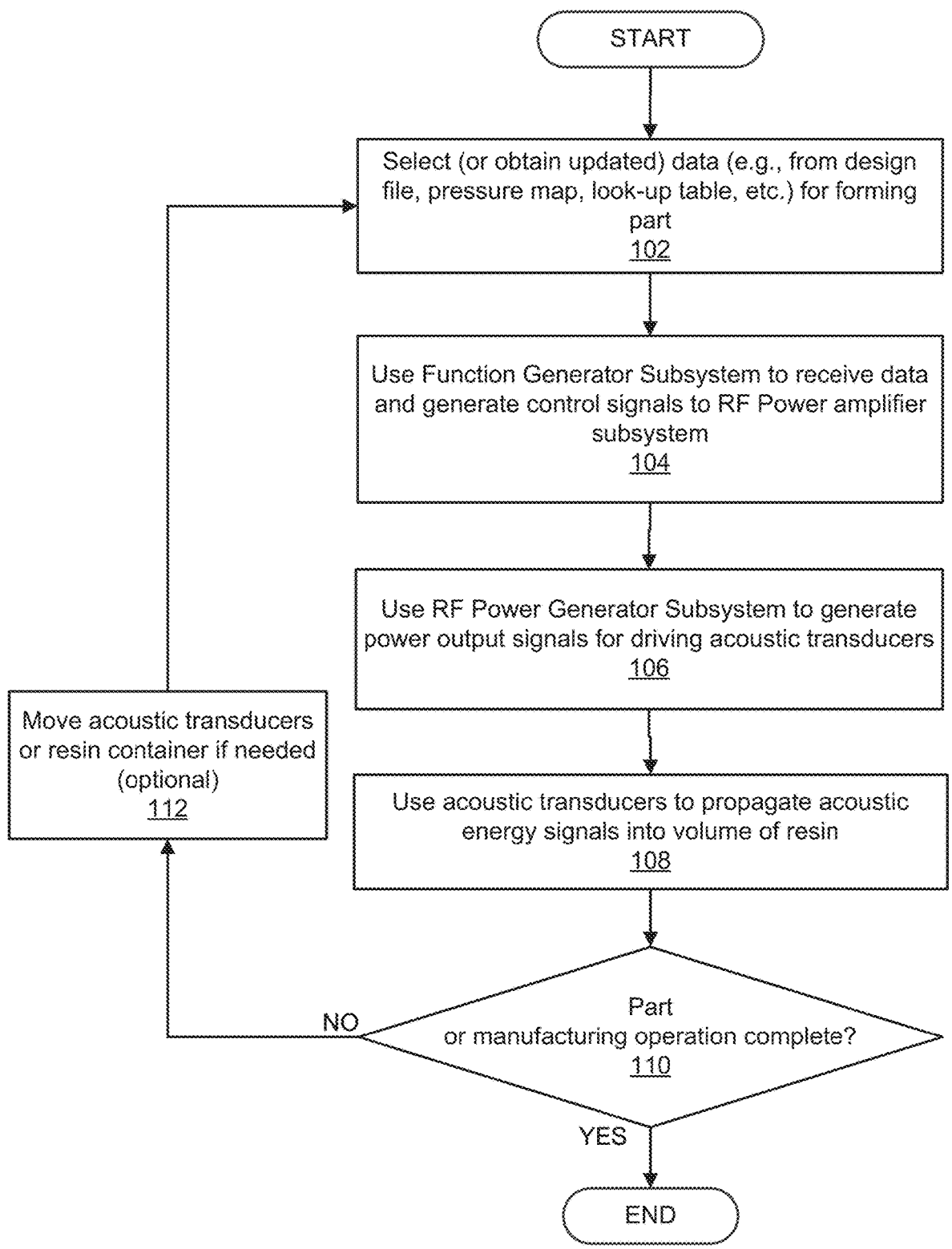
FIG. 6 is a high level flowchart of various operations that may be performed by any of the systems shown in FIG. 1, 3a, 4a or 5 in forming a part.

Referring now to FIG. 6, a high level flowchart 100 is shown to illustrate various operations that may be performed using the system 10, the system 60, the system 70 or the system 80. For convenience, various specific components of the system 10 will be referred to in FIG. 1 to aid in explaining a sequence of operation that may be carried out to polymerize a volume of resin to make a part.

At operation 102 the needed data is selected or obtained (e.g., design file, pressure map, look-up table data, etc.) by the electronic controller 12 for forming the part. The data corresponds to the dimensions, shape, features and any other factors which need to be addressed in creating the part. At operation 104 the function generator 18 is used to receive signals from the electronic controller 12 and to generate real time power control signals which are transmitted to the RF power amplifier subsystem 20. The real time power control signals are signals needed by the RF power amplifier system for creating the power output signals which have the characteristics needed (i.e., amplitude, frequency, duration, etc.) to drive the acoustic transducers 22a-22d to generate the desired amounts of ultrasound energy. At operation 106 the RF power amplifier subsystem 20 is used to generate the power output signals for driving the acoustic transducers 22a-22d.

At operation 108 the acoustic transducers 22a-22d are energized with the power output signals and propagate ultrasound energy signals into the volume of resin 24 at predetermined spatial locations within the volume of resin. At operation 110 the electronic controller 12 makes a check to determine if the manufacturing operation is complete (i.e., the part is fully formed from polymerized portions of the resin), and if not, operations 102-110 are repeated. If the acoustic transducers 22a-22d are mounted on a movable stage, or the resin container 26 is mounted on a movable stage, then optional operation 112 may be performed to controllably rotate the movable stage or the resin container to a new angular position before repeating operations 102-110. When operation 110 indicates that the part is complete, the method ends.

The systems and methods of the present disclosure provide the significant advantage of enabling ultrasound-induced additive manufacturing, which enables even faster polymerization than conventional photo stereolithography methods, and can be implemented with even less complex resin formulations (i.e., no photo or thermal initiators). Unlike photo stereolithography, which requires photo-initiators and light of specific wavelength(s), the approach taken using the present disclosure is agnostic to the refractive index of light. As a result, dark, opaque, or cloudy resin solutions can be used, which would be difficult to use or unusable with traditional photo stereolithography systems. As a result, the systems and methods of the present disclosure are not subject to limitations of light or heat, which are required in other forms of additive manufacturing applications. This opens the present disclosure up to use in making parts where the use of light or heat is undesirable for the specific type of part being made, or the material from which the part is made from. The system and method of the present disclosure, using ultrasound energy, enables opaque or dark resin solutions, or even differently colored resins (i.e., not optically clear) to be used which would otherwise likely create issues with conventional photo stereolithography systems, or and further enables resins to be used with additives that would be degraded or damaged by high heat or UV light. The present system and method is also expected to find utility in applications where composite materials (e.g., polymer-filler) are used, which may be opaque or dark as well.

It will also be appreciated that while the foregoing discussion has been centered around the use of a resin (e.g., a polymer), that the teachings herein may be used to form composite parts that are made of mixtures of polymers and other materials, for example a polymer having metal micro particles or nanoparticles. Metal particles do not need to have surface oxide removed to facilitate this reaction. Both gold (which is not easily oxidized) and aluminum or gallium or gallium-indium alloy (which are all easily oxidized) can react with the monomers in the resin.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An additive manufacturing system for at least one of forming a part or modifying a surface using a volume of polymerizable resin, the system comprising:
a memory;
a subsystem including an electronic controller in communication with the memory for generating power output signals;
a plurality of acoustic transducers placed in a vicinity of the volume of polymerizable resin, in a predetermined orientation relative to the volume of polymerizable resin, and being responsive to the power output signals;
the plurality of acoustic transducers each being modulated in a desired pattern to generate and project ultrasound energy in response to receiving the power output signals to a plurality of selected, different spatial locations within the volume of resin, wherein the ultrasound energy is selectively generated to cause cavitation bubbles to be produced at the selected, plurality of selected, different locations within the volume of resin, which cause polymerization within at least one portion of the volume of resin to at least one of form the part or modify the surface; and
at least one software module stored in the memory including at least one of:
a software algorithm; or
a look-up table; or
a pressure map,
which includes information for generating the power output signals to control at least one of frequency, amplitude or pulse duration of the ultrasound energy being emitted by the plurality of acoustic transducers, as needed, to selectively cause cavitation bubbles to be generated from the ultrasound energy at one or more locations within the volume of polymerizable resin to at least one of form the part or modify the surface; and
wherein a select one of the plurality of acoustic transducers is operated at a higher frequency and a lower power than a remainder of the plurality of acoustic transducers to operate as a monitoring transducer by producing an audible signal with a decreasing volume as polymerization progresses, and becomes imperceptible to a human ear when polymerization is complete.

2. The system of claim 1, wherein at least one of the plurality of acoustic transducers comprises a piezoelectric transducer.

3. The system of claim 1, wherein at least one of the plurality of acoustic transducers comprises a laser.

4. The system of claim 1, wherein ones of the plurality of acoustic transducers are located at a plurality of spatially separated locations around the volume of polymerizable resin.

5. The system of claim 1, wherein the plurality of acoustic transducers are located to form at least one of a square, a rectangle, a circle, a pentagon, a hexagon, an octagon or a triangle, around the volume of resin.

6. The system of claim 1, wherein the subsystem for providing the power output signals comprises an RF power amplifier subsystem.

7. The system of claim 6, wherein the electronic controller is configured to generate real time power control signals applied to the RF power amplifier subsystem.

8. The system of claim 7, wherein the electronic controller includes a function generator subsystem which is controlled by the electronic controller to generate the real time power control signals.

9. The system of claim 8, wherein the electronic controller includes the memory for storing at least one software module for helping to create the real time power control signals.

10. The system of claim 9, wherein the at least one software module includes a design file.

11. The system of claim 1, further comprising a monitor for monitoring operation of the system while manufacturing the part or modifying the surface.

12. The system of claim 5, wherein the plurality of acoustic transducers are all energized simultaneously to simultaneously propagate ultrasound energy into the volume of polymerizable resin.

13. An additive manufacturing system for at least one of forming a part or modifying a surface using a volume of polymerizable resin, the system comprising:
a subsystem for generating power output signals;
an electronic control system having a memory, the memory including a software module which makes use of data associated with at least one of:
an algorithm to help create the power output signals; or
a look-up table to help create the power output signals; or
a pressure map, to help create the power output signals;
the data being such that at least one of the algorithm, the look-up table or the pressure map enables the power output signals to be formed in a manner to help selectively control cavitation within select portions of the volume of polymerizable resin to form the part or modify the surface;
a plurality of acoustic transducers placed in a vicinity of the volume of polymerizable resin, and in a predetermined orientation relative to the volume of polymerizable resin, to at least partially circumscribe the volume of polymerizable resin, and being responsive to the power output signals; and
the plurality of acoustic transducers configured to generate and project ultrasound energy using at least one of the algorithm, the look-up table or the pressure map, in a predetermined sequence response to receiving the power output signals to a plurality of spatial locations within the volume of polymerizable resin, at least one of sequentially in a predetermined pattern or simultaneously, depending on specific spatial locations within the volume of polymerizable resin where polymerization is needed;
the power output signals further being modulated in at least one of frequency, amplitude or pulse duration, and operative to selectively cause cavitation bubbles to be created at the plurality of spatial locations within the volume of polymerizable resin, which produces a required polymerization of portions of the volume of polymerizable resin, in accordance with the data, to at least one of form the part or modify the surface; and
wherein a select one of the plurality of acoustic transducers is operated at a higher frequency and a lower power than a remainder of the plurality of acoustic transducers to operate as a monitoring transducer by producing an audible signal with a decreasing audible volume as polymerization progresses.

14. The system of claim 13, wherein the plurality of acoustic transducers are energized simultaneously.

15. The system of claim 13, wherein the plurality of acoustic transducers are energized sequentially in the predetermined pattern.

16. A method for at least one of manufacturing a part or modifying a surface using a volume of polymerizable resin, the method comprising:
  providing data selected to help at least one of construct the part or modify the surface;
  providing a memory;
  providing a subsystem including an electronic controller in communication with the memory for generating power output signals;
  modulating a plurality of acoustic transducers placed in a vicinity of the volume of polymerizable resin, in a predetermined orientation relative to the volume of polymerizable resin, and being responsive to the power output signals;
  further modulating the plurality of acoustic transducers in a desired pattern to generate and project ultrasound energy in response to receiving the power output signals to a plurality of selected, different spatial locations within the volume of resin, wherein the ultrasound energy is selectively generated to cause cavitation bubbles to be produced at the selected, plurality of selected, different locations within the volume of resin, which cause polymerization within at least one portion of the volume of resin to at least one of form the part or modify the surface;
  using at least one software module stored in the memory including at least one of:
    a software algorithm; or
    a look-up table; or
    a pressure map,
    which includes information for generating the power output signals, to control at least one of frequency, amplitude or pulse duration of the ultrasound energy being emitted by the plurality of acoustic transducers, as needed, to selectively cause cavitation bubbles to be generated from the ultrasound energy at one or more locations within the volume of polymerizable resin to at least one of form the part or modify the surface; and
  wherein a select one of the plurality of acoustic transducers is operated at a higher frequency and a lower power than a remainder of the plurality of acoustic transducers to operate as a monitoring transducer by producing an audible signal with a decreasing volume as polymerization progresses, and becomes imperceptible to a human ear when polymerization is complete;
  using the data to help create and propagate ultrasound energy into the volume of polymerizable resin; and
  using the ultrasound energy to polymerize at least one select spatial region within the volume of resin to at least one of create the part or modify the surface in accordance with the data.

17. The method of claim 16, wherein using the data to help create and propagate ultrasound energy comprises using the data to help create electrical power output signals for driving an acoustic transducer.

18. The method of claim 17, wherein using the data to help create electrical power output signals for driving an acoustic transducer comprises using the data to help create electrical power output signals for driving a plurality of acoustic transducers arranged to at least partially circumscribe the volume of resin, and energizing ones of the plurality of acoustic transducers at least one of:
  simultaneously; or
  in a predetermined pattern.

* * * * *